April 1, 1924.

J. N. BUCK 1,488,734

SINGLETREE IRON

Filed Aug. 31, 1922

INVENTOR.
JOHN N. BUCK
BY
ATTORNEYS.

Patented Apr. 1, 1924.

1,488,734

UNITED STATES PATENT OFFICE.

JOHN N. BUCK, OF LOWDEN, WASHINGTON.

SINGLETREE IRON.

Application filed August 31, 1922. Serial No. 585,347.

*To all whom it may concern:*

Be it known that I, JOHN N. BUCK, a citizen of the United States, residing at Lowden, in the county of Walla Walla and State of Washington, have invented certain new and useful Improvements in Singletree Irons, of which the following is a specification.

This invention relates to an improved iron for singletrees and the like and has as one of its objects to provide an iron having a renewable wearing portion.

A further object of the invention is to provide an iron that is simple to construct, and simple to attach to a singletree, and which carries a hook bearing bushing whereby the iron is made very much more desirable.

With these and other objects in view reference is had to the accompanying drawings in which—

Figure 1:
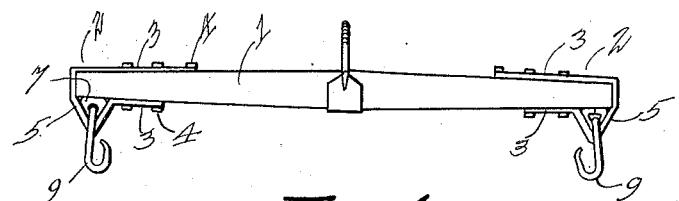
Fig. 1 is a plan view of a singletree showing irons attached.
Figure 2:
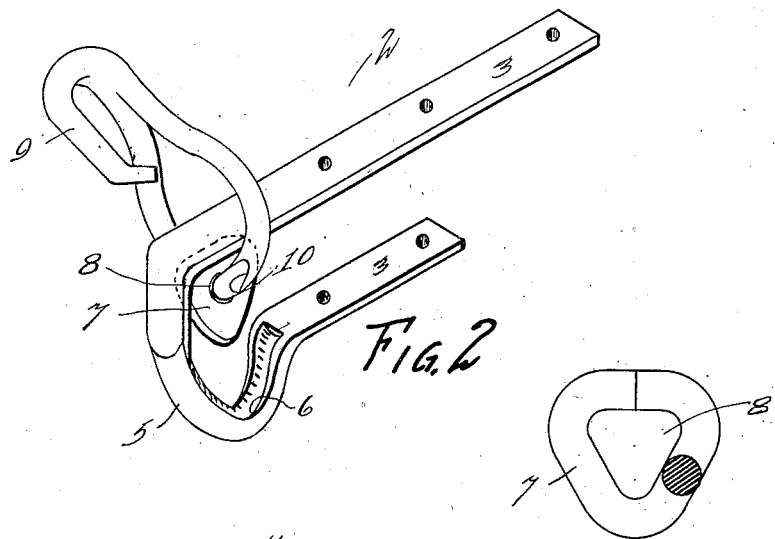
Fig. 2 is an enlarged perspective view of one of the irons.

Having reference to the drawings like numerals refer to like parts throughout the several views and the numeral 1 refers to a singletree which is of the usual type, and which is provided with the singletree irons 2.

The irons 2 consist preferably of parallel bars 3 by which it may be fastened to the singletree by the addition of bolts 4, and a loop portion 5 formed integral with the bars.

The loop portion is preferably grooved at 6 to form a female seat for the bushing 7, the last mentioned member being designed to register with the groove and provided with corresponding edges therefor.

In regard to the design of these parts it is obvious that they may be reversed and that the bushing could be made with a female seat to receive the loop portion. This design is not shown in the drawings as it is deemed unnecessary in view of the fact that substitution of this sort is old in the art.

Figure 4:
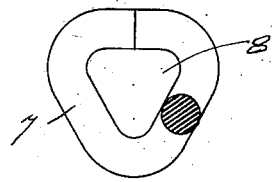
Fig. 4 shows a modified form of bushing, and showing its cross section by section lines thereon.
Figure 3:
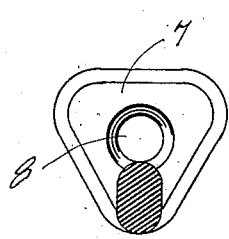
Fig. 3 is a side elevation of one form of bushing, and showing its cross section by section lines thereon.

The bushing 7 may be made of a flat plate having rounded edges, as shown in Fig. 3 or may be formed of round iron rod, as shown in Fig. 4, in both cases a hole 8 is provided to receive the hook 9 which may be welded therein as at 10.

The device is used in the usual manner of other irons of this class, but by means of the changeable bushing 7, which may be moved as the wear occurs, all wear is taken from the loop by the bushing and hence by renewing the bushing, and with it a new hook, which has probably also worn, the iron is maintained to normal usefulness with a minimum of expense.

The loop portion is positioned adjacent to the side of the singletree so that the singletree forms one side of the loop and is thus utilized to maintain the bushing in the loop portion in a substantial manner.

Having thus described my invention what I claim and desire to secure by Letters Patent is—

1. In a singletree iron, an iron, attachable to a singletree, and provided with a grooved extended loop portion, and a hook carrying bushing removably mounted in said loop portion and shaped to register with the groove therein.

2. In a singletree iron, an iron, having an extended, grooved, triangular shaped loop portion, said loop portion positioned adjacent to the side of the singletree, and a corresponding triangular shaped bushing mounted in the groove of said loop portion and maintained therein by the side of said singletree.

In testimony whereof I affix my signature.

JOHN N. BUCK.